United States Patent [19]
Nixon

[11] Patent Number: 5,185,197
[45] Date of Patent: Feb. 9, 1993

[54] MULTICOLOR TEXTURED FINISHED FIBERGLASS/MINERAL FIBER ACOUSTICAL WALL AND CEILING PANELS

[76] Inventor: Michael T. Nixon, 2810 Urbandale La., Plymouth, Minn. 55447

[21] Appl. No.: 342,902

[22] Filed: May 8, 1989

[51] Int. Cl.⁵ .............................................. D04H 1/08
[52] U.S. Cl. .................................. 428/246; 428/284; 428/290; 428/298; 428/904.4; 428/920
[58] Field of Search .............. 428/900, 901, 273, 156, 428/246, 282, 285, 921, 131, 134, 192, 194, 319.7, 920, 206, 327

[56] References Cited

U.S. PATENT DOCUMENTS 3,908,059 10/1980 Stern et al. ...................... 52/309.4
4,756,955 7/1988 Rias .................................. 428/281

Primary Examiner—Patrick J. Ryan
Assistant Examiner—R. C. Weisburger
Attorney, Agent, or Firm—Haugen and Nikolai

[57] ABSTRACT

This invention relates to the construction and manufacture of lightweight fibrous acoustical wall and ceiling panels. The acoustical panel is comprised of a lightweight fiberglass core to which a white or light colored glass mat is applied. The glass mat provides a relatively stiff surface to the fiberglass and at the same time bridges irregularities inherent in lightweight acoustical fiberglass core materials. The white or light colored glass mat covers the natural yellow or light brown color of the core material sufficiently to provide a suitable base to which multicolored flakes with an adhesive binder can be applied using a spray tecnique.

4 Claims, 2 Drawing Sheets

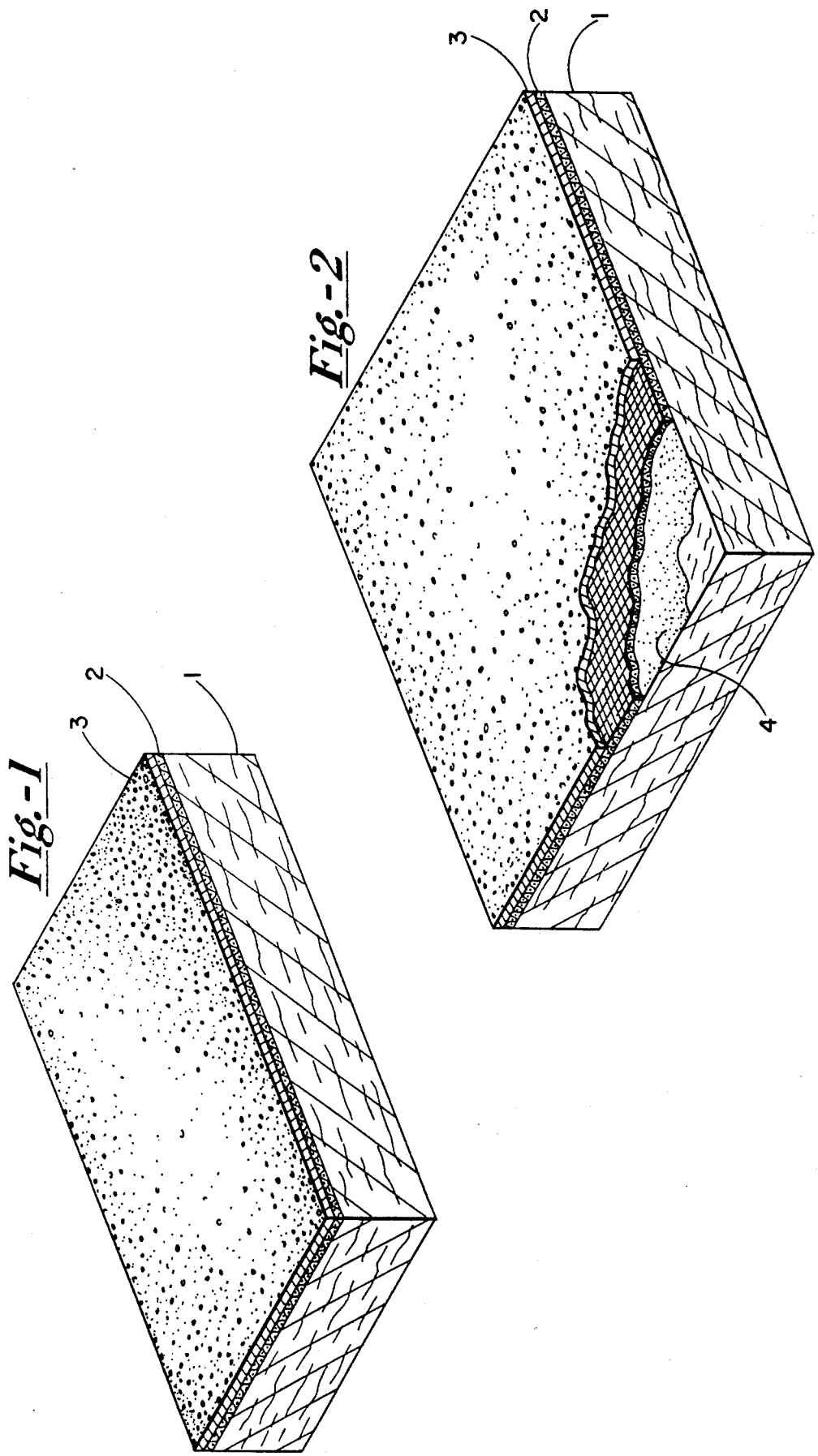

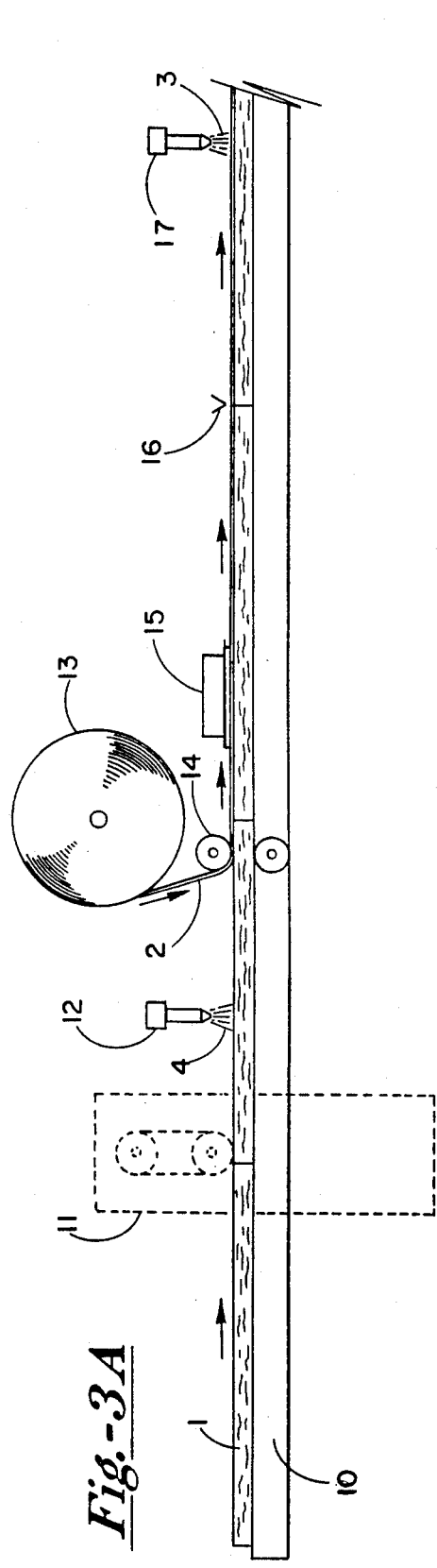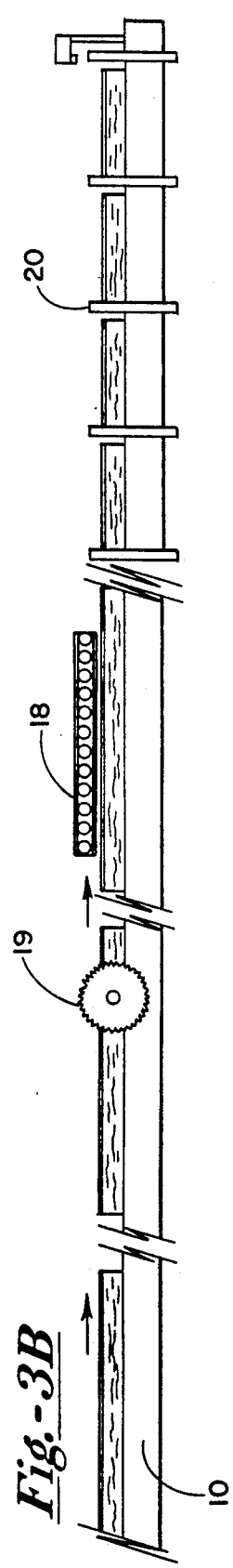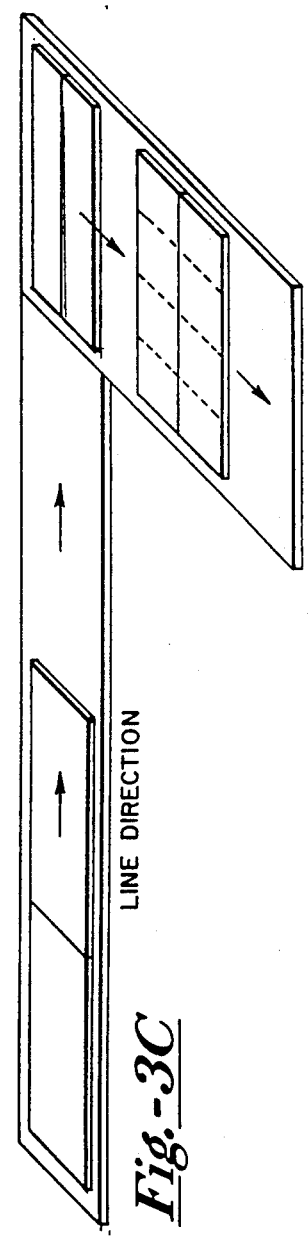

MULTICOLOR TEXTURED FINISHED FIBERGLASS/MINERAL FIBER ACOUSTICAL WALL AND CEILING PANELS

FIELD OF THE INVENTION

The present invention relates to acoustical wall and ceiling panels. More particularly, the present invention relates to wall and ceiling panels having a light density fibrous core and a colored, textured exterior. This invention also relates to a low cost method for making such panels.

BACKGROUND OF THE INVENTION

Fiberglass semirigid boards in the range of 1.5 to 4 pounds per cubic foot density exhibit acoustical characteristics that make them highly desirable as a base material for high performance acoustics. Such core materials demonstrate a high degree of flexibility and sponginess and also surface irregularities. These characteristics require fiberglass boards to be fused with a decorative pliable finish such as unsupported vinyl films or other decorative woven and non-woven fabrics if such boards are to be aesthetically acceptable. In the past, such facings have been bonded to the core materials and then cut into a variety of sizes to fit into a ceiling grid system or some other type of frame.

Today, acceptable films and facings are available only in a limited range of colors, patterns and textures. Providing a greater variety of film colors and textures is prohibitive from a cost standpoint due to the high minimum quantities required to justify their production. Furthermore, very few other facings are suitable for bonding to lightweight glass fiber boards due to surface irregularities. The natural soft spongy composition of the fiberglass core material also make it very difficult for woven or non-woven fabrics to be utilized in the production of an economical product.

Nearly all fiberglass ceiling tiles made today are faced with a textured lightweight vinyl film material. Such films are generally white in color. Color options are limited to no more than 4 or 5. In addition to vinyl film facings, woven glass cloth fabrics are used. These fabrics are predominant in commercial construction for fiberglass facing. Such woven fabrics are available in solid color but in only about 6 color variations.

Ceiling tile facings not only need to possess certain characteristics that will enable them to bridge surface irregularities of the bulk board but also must have the ability to: (1) maintain or even enhance the basic high performance acoustical characteristics of the base fiberglass, (2) withstand compression and flexing of the finished product in the normal course of handling and installation and (3) meet all applicable building codes and fire protection laws. These requirements severely limit the number of facings available for use in the industry at a point in time when there is great emphasis and demand for a variety of colors for ceiling tiles and wall panels.

While paint might be assumed to provide an economical and colorful finishing agent, paint applied directly to fiberglass has been less than successful for a variety of reasons.

First, when applied in sufficient quantity to cover the yellow or brown natural fiberglass color, paint blocks the acoustical characteristics of the fiberglass core material.

Second, when applied lightly so the acoustical features of the fiberglass are not destroyed, the composition of most paints prevents the paint from working into the fiberglass strands. The paint inadequately covers the fiberglass causing the yellowish brown color of the fiberglass to be visible through the paint finish.

Third, when paints are applied in the traditional fashion to fiberglass, they need to be immediately heat dried. The paint becomes brittle in the dry state and has a tendency to crack and flake off of the fiberglass core. This problem is exacerbated when the materials are flexed or compressed during installation of the panels into a frame or grid system.

Fourth, while higher density fiberglass may be used to overcome some of the problems outlined above, higher density fiberglass is much more costly. Also, the higher density fiberglass is less resilient to impact and more likely to show damage resulting from handling and use.

There is currently a need for high performance acoustical ceiling and wall panels that are both economical and available in a wide range of colorful, durable finishes. Such finishes need to overcome the inherent problems described above and meet the prevailing building and fire protection codes.

SUMMARY OF THE INVENTION

The present invention provides for a lightweight fiberglass acoustical ceiling or wall panel having good sound absorbing properties. The panel is fabricated in a manner to permit a wide variety of colorful finishes. These finishes and additional components add structural strength to the fiberglass core that increases the panel's ability to withstand sagging when supported only at the perimeter edge of the panel.

The present invention provides finishing materials and application techniques which made it possible to economically provide an extensive range of colorful textured finishes that do not significantly impede the basic acoustical properties. These finishes are also sufficiently non-combustible and flame resistant for use in commercial construction. Limited cleaning of the product using readily available cleaning agents is also possible with such finishes.

The principle object of this invention is to provide an acoustical ceiling or wall panel to which various colored and textured finishes can be economically applied without significant reduction in the acoustical characteristics of the panel.

Another object of this invention is to provide such a panel which is flexible, durable and easily cleaned.

A third object of this invention is to provide such a panel which is sufficiently non-combustible and flame resistant for use in commercial construction.

These and other objects of the invention will become more clear from a review of the following detailed description of the invention in light of the accompanying drawings and appended claims.

DESCRIPTION OF THE DRAWINGS

FIG. 1 is a cross sectional view of an acoustical panel made in accordance with the present invention.

FIG. 2 is a perspective view of an acoustical panel built in accordance with the present invention.

FIG. 3 is a schematic drawing depicting the process by which the panels of the present invention are made.

DETAILED DESCRIPTION OF THE INVENTION

As best shown in FIG. 1, the panels of the present invention comprise a fiberglass core 1, a glass mat 2 and a finish coat 3. The core 1 is preferably made of a fibrous glass with a phenolformaldehyde resin-cured base. The core 1 should have a density of 1.5 to 4 pounds per cubic foot. The preferred density is of between 2.5 and 3 pounds per cubic foot. The core 1 will preferably have a thickness of between ¾" and 1". Other densities and thicknesses may be used. Such variations will have a predictable positive or negative effect on acoustical performance, however.

The fiberglass core 1 is faced with the mat 2. The mat 2 is in the form of a mesh which is 5–10 mils thick. Suitable materials for the mat 2 are a commercially available in a variety of thicknesses and densities. Preferably, the mat 2 is made of a fibrous glass with a modified urea-formaldehyde cured resin binder.

As shown in FIG. 3, the mat 2 is made of long glass fibers 10 which are bound together with a resin binder. When cured, the bound fibers produce a continuous sheet or roll of sufficient stiffness to bridge irregularities inherent on the surface of the fiberglass core 1. Color may be altered by adding pain additives to the mat 2 in its cured state.

During the assembly process, the mat 2 is laminated to at least one face of the fiberglass core with a co-polymer emulsion adhesive 4 by spraying the adhesive onto the surface of the fiberglass core 1. Such method of adhesive application allows the adhesive to simply lay on the face of the fiberglass in sufficient unconnected globules to permit consistent coverage without penetrating into the fiberglass core 1. When the face of mat 2 contacts the adhesive globules, the adhesive, by reason of the pressure that is applied by pinch rollers, provides sufficient contact with both mat 2 and the fiberglass core 1 to bind them together. The laminated composite of mat 2 and core 1 is then subjected to pressure contact of heated ironing plates that promote immediate curing of the adhesive emulsion thereby forming a permanent bond between the mat 2 and fiberglass core 1.

Those versed in the art will readily see that the pinch roller process can be eliminated and, alternatively, the mat face can be contacted to the core material via direct pressure from the heating irons. The mat is fed onto the core by means of a roller immediately adjacent to the front end of the heating irons.

The mat 2 is of a glass composition and serves only as a substrate. High heat—in the range of 350–450 degrees Fahrenheit—does not mar or scorch the mat 2.

The stiffness of the mat 2 tends to bridge irregularities in the fiberglass core 1 or conversely pull the loosely knit fibers of the core 1 up to the surface of mat 2 due to the high heat bonding accomplished by the heating irons. Also due to the stiffness of the mat facing, high points will be slightly compressed so as to provide an overall more acceptable degree of flatness.

While the fiberglass core 1 and mat 2 are still hot from the heat iron process, the mat 2 is sprayed with a textured paint. Preferably, a thin texture of tiny flakes measuring approximately 1/16" in diameter are applied. The flakes can be of different colors to produce a subtle mottling appearance.

Suitable textured paint finishing materials are commercially available from a number of vendors. The inventor has found a product manufactured by A tex, Ltd. of Great Britain under the trademark MULTIFLEK to be particularly suitable. The MULTIFLEK product is comprised of: vinyl acetate ethelene copolymers (8%); ground gypsum filler (11%); poly acrylate thickener powder (2%); soda ash (1.5%); decabromod.phenol oxide (5.5%); and emulsion paint flakes (72%). The flakes and polymer-based binders of the MULTIFLEK product are mixed with water to produce an emulsion which is sprayed onto the mat 2. The inventor's use of MULTIFLEK is contrary to the manufacturer's specifications. MULTIFLEK is primarily a spray finish for block plaster or drywall ceilings and walls. Normal application of MULTIFLEK requires that such surfaces be first treated with a primer to provide a uniform base color and to promote adhesion of the finish coat to the primer coat.

It has been determined that in the case of this invention, no primer coat is needed either from an appearance and adhesion standpoint. Eliminating the use of a primer reduces the amount of time required to dry the base coat thereby increasing productivity. The absence of a primer coat also enhances acoustical performances. The primer can be eliminated with the present invention because the substrate formed by core 1 and mat 2, by reasons of the fiberglass strand layup, will provide a good anchoring mechanism for the flake/emulsion composition of the MULTIFLEK product. Also, the mat 2 provides a uniform stable color base to which the MULTIFLEK finish can be applied.

The manner in which the finish is applied is important. When applied as described above, the finish does not cover the surface of the mat 2 and core 1 completely. Invisible or at least unnoticeable uncovered areas are present which permit sound waves to pass though the surface finish. This is why the resulting product achieves excellent acoustical absorption.

Even though the textured paint finish does not completely and continuously cover the face of the panel, it provides a pleasing decorative appearance. The mixture of flakes and attendant binder emulsion of the finish provide a textured surface by reason of the random lay of the flakes. This is further enhanced by the mottled effect produced by introducing a mixture of colored flakes to produce a predominant color.

Following full curing of the surface treatment, the finish is relatively hard, flexible, and mar-resistant. The polymer binder in the cured surface treatment not only provide excellent adhesion, but remains pliable so that the finish, under normal handling and usage, will not crack, peel or flake off.

As a result of considerable experimentation, the inventor has learned that the textured finish may be applied first to a woven mat fabric for later application to the fiberglass core 1. When applied to such a mat, the composite material is sufficiently pliable to allow it to be rolled up for subsequent lamination to the fiberglass core 1 or to other materials such as mineral board, plywood or gypsum board. It has also been determined that the adhesion of the finish can be increased by mixing an additional polymer liquid adhesives in with the dry flake mixture in lieu of water.

With reference to FIG. 3, a preferred process by which the panels of the present invention can be made will be described. The equipment includes a continuous conveyor system 10 which carries sheets of the material of core 1. As the material of core 1 is moved along the continuous conveyor system 10, it is first exposed to the sanding unit 11 which smooths the surface of the core 1 to which the mat 2 will be applied. Next, the material of core 1 passes beneath a spray head 12 which applies the adhesive 4.

A roll 13 of the material of mat 2 is positioned so material will come off the roll in accurate face-to-face registration with the surface of the core material to which the adhesive has been applied. Pinch rollers 14 are used to ensure proper alignment and force the material of mat 2 together with the material of core 1.

The materials of mat 2 and core 1, in proper registration, are then moved past a heating plate 15 to promote immediate curing of the adhesive. Next, a cutting unit 16 is used to cut the panels to length and a finish spray unit 17 is used to apply the finish coat 3 while the panel is still hot. An additional heating unit 18 may also be used to promote quick curing of the finish. When the multicolored flakes with its adhesive emulsion binder drys, the flakes are permanently bonded to the core/mat substrate. The cured adhesive emulsion provides sufficient elasticity so that the bond of the flakes to the substrate is maintained even when the lightweight fiberglass if flexed or compressed. Finally, the laminate of the core 1, mat 2 and finish 3 is subjected to cutting units 19 and 20 which trim the laminate to the desired panel size.

What is claimed is:

1. A decorative panel comprising:
    (a) a core made of a fibrous glass with a phenolformaldehyde base resin and having a density of 1.5 to 4 pounds per cubic foot having at least one irregular surface;
    (b) a mat made of a fibrous glass with a ureaformaldehyde cured resin binder;
    (c) means for securing said mat to at least one irregular surface of said core said means being a sprayed copolymer emulsion adhesive, said mat serving to bridge said irregular surface of said core; and
    (d) a flaked textured paint finish including visibly unnoticeable uncovered areas which permit sound to pass through the finish.

2. The panel of claim 1 wherein the paint finish material is comprised of a vinyl acetate ethelene copolymer, ground gypsum filler, a poly acrylate thickener, soda ash, decarbromodiphenol oxide, and paint flakes.

3. The panel of claim 1 wherein said core has a thickness of 0.75 to 1 inch.

4. The panel of claim 1 wherein said mat is in the form of a mesh and is 5-10 mils thick.

* * * * *